United States Patent
Viti

(12) 
(10) Patent No.: US 6,320,343 B1
(45) Date of Patent: Nov. 20, 2001

(54) FINE PHASE FREQUENCY MULTIPILER FOR A BRUSHLESS MOTOR AND CORRESPONDING CONTROL METHOD

(75) Inventor: Marco Viti, Sesto S. Giovanni (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/506,501

(22) Filed: Feb. 17, 2000

Related U.S. Application Data
(60) Provisional application No. 60/120,956, filed on Feb. 19, 1999.

(51) Int. Cl.[7] ............................................. G05B 11/01
(52) U.S. Cl. ........................ 318/560; 318/568.17; 318/592
(58) Field of Search ............................. 318/560, 568.17, 318/592, 594, 601, 604; 360/78.05

(56) References Cited

U.S. PATENT DOCUMENTS

| | | | |
|---|---|---|---|
| 3,686,547 | * 8/1972 | Kelling | 318/594 |
| 3,789,391 | * 1/1974 | Brock et al. | 340/347 SY |
| 3,943,342 | * 3/1976 | May et al. | 235/150.53 |
| 4,315,198 | * 2/1982 | Lin et al. | 318/594 |
| 4,599,547 | * 7/1986 | Ho | 318/594 |
| 4,621,224 | * 11/1986 | Watabe et al. | 318/594 |
| 5,136,226 | * 8/1992 | Schneider | 318/632 |
| 5,262,707 | * 11/1993 | Okazaki et al. | 318/592 |
| 5,543,697 | * 8/1996 | Carobolante et al. | 318/594 |
| 5,796,544 | * 8/1998 | McMurtrey | 360/77.07 |

FOREIGN PATENT DOCUMENTS

| | | |
|---|---|---|
| 0515970-A1 | * 12/1992 | (EP) . |
| 54-111073 | * 8/1979 | (JP) . |
| 61-121108 | * 6/1986 | (JP) . |
| 1-244511 | * 9/1989 | (JP) . |

* cited by examiner

*Primary Examiner*—Paul Ip
*Assistant Examiner*—Rina I. Duda
(74) *Attorney, Agent, or Firm*—Theodore E. Galanthay; Allen, Dyer, Doppelt, Milbrath & Gilchrist, P.A.

(57) ABSTRACT

A circuit to establish an accurate instantaneous position of a DC motor rotor includes an input terminal to receive a rotor position signal. A first counter circuit counts to a value between two successive rotor position signals at a slow clock rate, and stores this count value in a register. Then a second counter begins counting from zero at a system clock rate, which is faster than the slow clock rate. The first counter circuit and the second counter circuit are evaluated by a comparator, and when the counters equal one another, the instantaneous position signal is generated. Alternately, the second counter can be a down-counter that is initially loaded with the count value, and the instantaneous position signal is generated when the second counter reaches zero. In both versions, another sub-circuit can be added which, for a first cycle after the rotor position signal is received, causes the instantaneous position signal to be generated at a time calculated to equal the lag time from the actual position of the motor rotor and when the rotor position signal is received. In the first version, the comparator outputs the signal when the second counter reaches the offset count value, instead of when the second counter reaches the count value generated by the first counter. In the second version, the offset value is loaded into the count-down timer the first cycle after the rotor position signal is received.

28 Claims, 5 Drawing Sheets

FINE PHASE FREQUENCY MULTIPILER FOR A BRUSHLESS MOTOR AND CORRESPONDING CONTROL METHOD

RELATED APPLICATION

This application is based upon prior filed copending provisional application Ser. No. 60/120,956 filed Feb. 19, 1999.

FIELD OF THE INVENTION

The present invention relates to a method for siting, with a higher degree of accuracy, the instantaneous position of the rotor of a brushless motor, and more particularly, for motors in Hard Disks Drives, DVD's (Digital Video Disks), tape drives for video-recorders, CD players, etc.

BACKGROUND OF THE INVENTION

A brushless motor typically includes a permanent magnet rotor and a stator having three, normally delta connected windings. Motors of this type are usually driven from integrated circuits whose output stage, supplying the winding phases, has a full-wave three-phase bridge circuit formed from six power transistors of the bipolar or the MOS type. FIG. 1 shows an example of such a driver stage and a circuit diagram of a DC brushless motor connected thereto.

The most typical form of driver in use with motors of this type is the bipolar driver, whereby two phases are under power while the third is floating (having a bridge output in a high-impedance state: Hi Z) at any one time.

The powered phases are switched in a cyclic sequence which must be synchronized with the instantaneous position of the rotor. This position is detected by analysis of the back electromotive force (BEMF) of the floating phase or detected by sensors. The detection is usually made with bipolar type drivers.

For improved performance of the system, the phase supply should be optimized to operate the motor at the peak of its efficiency, which can be obtained by driving the phases while retaining a precise phase relationship between the current and BEMF of each phase (with the optional use of position sensors). In synchronous permanent magnet motors, like the DC brushless motor, torque is provided by the component of the stator current which is generating a magnetic field in quadrature with that generated by the rotor.

If $i_d$ and $i_q$ and the components of the stator current that generate the magnetic fields in a straight axis and in quadrature, respectively, with that from the rotor: peak efficiency is achieved when $i_d=0$. In order to have the whole of the stator current generate the fields in quadrature, it is mandatory that the current of each coil be driven in phase with its BEMF.

Heretofore, the control of motor position, and hence the accuracy of the motor operation, has been limited to 60 electrical degrees. In general, one signal occurs every 60 degrees which is used as an indicator of the instantaneous position of the motor (as by sensing the BEMF of the coils or using purposely designed position sensors), and this information is utilized to adjust the drive voltages or currents for the new position. This results in a clipped drive waveform (FIG. 2) which is apt to originate acoustic and electromagnetic noise in the motor. Such noise is problematic in disk drive motors, CD motors etc., because this generated noise can interfere with the reading or writing signals of the device, causing incorrect results and reduced performance of the device.

SUMMARY OF THE INVENTION

Principles of embodiments of the invention de-correlate the accuracy of voltage (or current) control from the angular precision in detecting the instantaneous position of the rotor. Once the rotational frequency of the motor is known (knowing the instantaneous position, it becomes possible to calculate the period between successive indicators, and hence the frequency), a signal can be obtained which is N (N>0) times more frequent, and this signal can be used as a new position reference to determine the most appropriate voltage or current drive signal.

A further feature of embodiments of the invention includes the ability to adjust an offset of the calculated signal from the measured position reference signal (ZC) to a high degree of precision. This feature is discussed with reference to "fine adjustment" herebelow.

BRIEF DESCRIPTION OF THE DRAWINGS

FIG. 3a is a schematic diagram illustrating the principles of an embodiment of the invention.

FIG. 3b is a graph showing the time pattern of the operation of the circuit shown in FIG. 3a.

FIG. 4a is a schematic diagram illustrating the principles of a second embodiment of the invention.

FIG. 4b is a graph showing the time pattern of the operation of the circuit shown in FIG. 4a.

FIG. 5 is a block diagram showing a hard disk drive including the circuit shown in FIGS. 3a or 4a.

DETAILED DESCRIPTION OF THE PREFERRED EMBODIMENTS

Embodiments of the invention create a signal which can provide a new reference for the rotor position of a motor. The created signal is then utilized to generate drive signals having a pattern closer to the peak efficiency required by the characteristics of the driven motor. This new reference signal, referred to as "ScanSignal", will be characterized by its frequency being N (N>0) times greater than the reference signal, ZC, commonly used in the prior art for the same purpose.

Figures 3A, 3B:
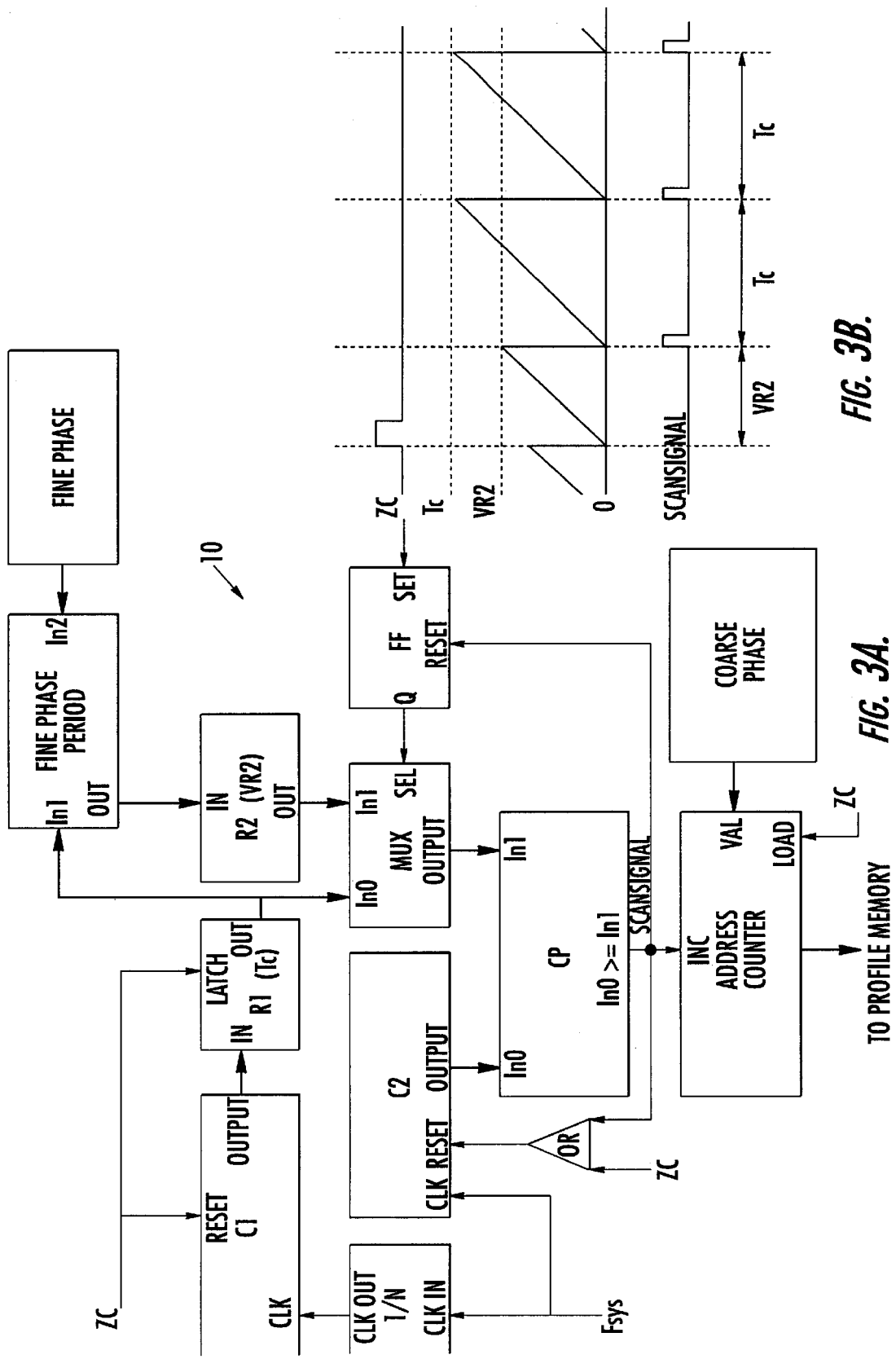

In the circuit 10 of FIG. 3a, a reference signal ZC, which can be obtained from a prior art system, is measured by an up-counting type counter C1 whose counting frequency is N times less than the system frequency Fsys, used for the digital section of an apparatus. The reference signal ZC indicates the time interval between successive indicator pulses, which are 60 degrees apart, as described above. This value will be re-calculated continually on the occurrence of each indicator signal, and form what will be termed the period "Tc".

In this embodiment, the value Tc (as measured by C1) is stored into a register R1 when the reference signal ZC is received. The contents of register R1 are compared with the output from a second counter C2, as described below. The second counter C2 is also an up-counter, with an operating frequency corresponding to the system frequency Fsys. A digital comparator CP compares the instantaneous contents of the second counter C2 with the contents of register R1, which contains the Tc value counted by the counter C1 in the previous cycle.

As an example, the counter C2 will start counting from 0, by an increment of 1 at each system clock pulse, up to Tc, which is stored in the Register R1. The comparator CP will acknowledge the equality of R1 and C2, and generate a pulse, thereby resetting the counter C2 to 0. The pulses generated by the comparator CP each time that the counter C2 reaches the value Tc (stored in Register R1) form the signal ScanSignal, which has a frequency N times higher than that of the indicator signals ZC from the motor position sensing block.

By so doing, however, the result of the generated signal ScanSignal is bound to prove low, because its offset from the original reference ZC cannot be controlled. The first pulse out is delayed on the reference signal ZC by a time Tc/N.

To compensate for this time delay, specially designed circuitry can be additionally provided including a register R2 that stores a value VR2. The value VR2 falls between 0 and Tc. During the first comparison of the circuit 10, the comparator CP compares the VR2 signal that is stored in the register R2 to the instantaneous signal generated by counter C2, rather than comparing the counter C2 to the Tc signal stored in register RI. In practice, counter C2 will now be counting from 0 to VR2, rather than from 0 to Tc as described above, and will only resume counting from 0 to Tc after the first count (up to VR2) is completed. Therefore, the resultant signal ScanSignal will be characterized by a frequency which is N times the frequency of the reference signal ZC, but the offset of ScanSignal from the reference signal ZC is controllable to an accuracy equal to Tsys, which is the period of the circuitry driving clock: Tsys=1/Fsys.

VR2 can be supplied from software for calculating its correct value from a value expressed in degrees, which may range from 0 to 360/(n*N), where n is the number of reference signal ZC's detected through an arc of 360 electrical degrees.

In the exemplary embodiment shown in FIG. 3, assume n=1. Accordingly, the register "Fine Phase" will contain a value in the 0 to 360/N range. This value is processed through a block "Fine Phase Period" which will calculate the value of VR2=Tc*FinePhase/(360/N). Of course, other methods may be used to compute the desired value of VR2, which is used to produce the desired offset between the generated signal ScanSignal and the starting reference signal ZC. The circuit 10 employs a multiplexer Mux for selecting, between Tc and VR2, the comparison value which is appropriate for the comparator CP for the given cycle. A selector flip-flop FF is a set/reset type of flip-flop. The flip-flop FF is set when it receives the reference signal ZC (whereby the multiplexer Mux will output VR2), and is reset when it receives the generated signal ScanSignal (whereby the multiplexer Mux will output Tc).

The resultant generated signal ScanSignal is also used to increment a modulo N counter "Address Counter" for a memory address whereat the optimum pattern is registered for driving an electric motor. When the reference signal ZC is received, the counter Address Counter is initialized at a value that was previously stored in a register "Coarse Phase."

With reference to FIG. 3a, the operation of the circuit 10 will be discussed, outputs of which can be seen in the FIGURE. The reference signal ZC is seen at the beginning of the graph, and was generated using prior art circuitry. In the prior art systems, this was the only instantaneous positional signal of the motor rotor, and this contributed to the excessive noise in the motors having the prior art circuitry. In this embodiment of the invention, once the reference signal ZC is received, an "or" gate OR in the circuit generates a "reset" signal to reset the counter C2 to 0. This corresponds to the first vertical line, time 0, in FIG. 3a.

After the counter C2 is reset, it immediately begins counting upwards from 0 at the clock system rate Fsys. The reference signal ZC is provided to the flip-flop FF, setting FF to 1. Setting the flip-flop FF to 1 causes the value stored in the register R2, which is the calculated offset value VR2, to be selected by the multiplexer Mux and provided to the comparator CP. Therefore, the comparator CP, during the first cycle after the reference signal ZC is received, compares the counter C2 to the offset value VR2. Once the counter C2 reaches the offset value VR2, the ScanSignal is generated. This corresponds to the second vertical line in FIG. 3a.

The generated ScanSignal resets the flip-flop FF to a 0, which in turn causes the multiplexer Mux to output the contents of the register R1 to the comparator CP. The register R1 contains the contents of the counter C1 when the reference signal ZC was received. This value was described above as Tc. Also, the generated ScanSignal reset the counter C2 so it begins counting from 0 again. Therefore, once the counter C2 reaches the value Tc stored in the register R1, a further ScanSignal is generated, shown as the third vertical line in FIG. 3A. Because the reference signal ZC is not immediately received again, the comparator CP continues to compare the contents of the counter C2 to the Tc value stored in register R1. Therefore, every time the counter C2 reaches this value, a ScanSignal is generated and the counter C2 reset.

Each time the reference signal ZC is received, in addition to the offset value VR2 being the value to which the contents of the counter C2 is compared for one cycle, a new value for Tc is stored in the latch R1. Therefore, if the frequency with which the reference signal ZC is received changes, so does the corresponding value of Tc, which therefore automatically adjusts the frequency of the generated signal ScanSignal to match. In this way, the circuit 10 is self adjusting and always provides an exact instantaneous position signal of the motor rotor, with a much higher degree of precision than the prior art circuits that only used the reference signal ZC.

Figures 4A, 4B:
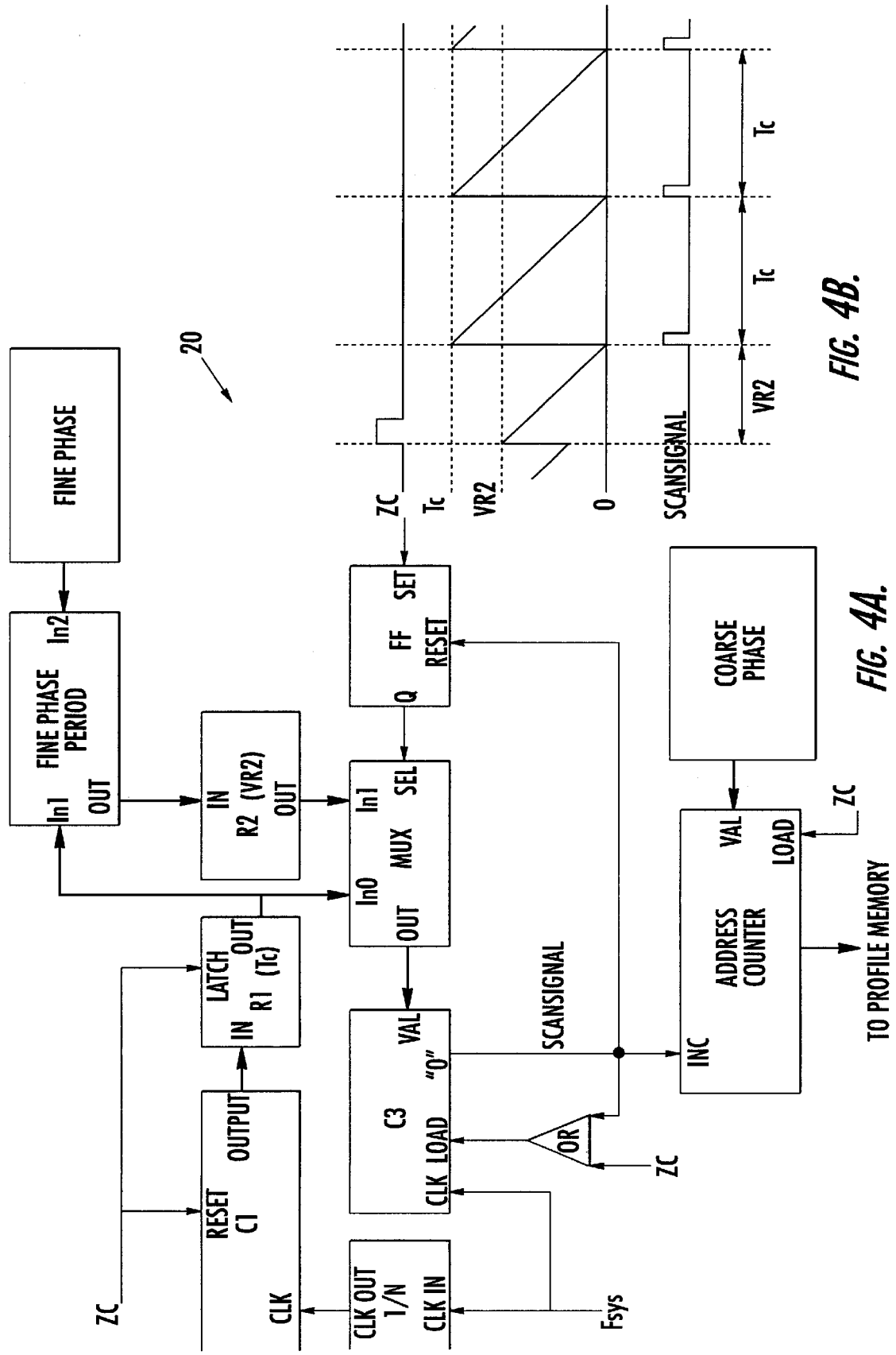

FIG. 4a shows a circuit 20 that illustrates an alternative way of producing the generated signal ScanSignal. In this embodiment, a pre-settable down-counter C3 is substituted for the counter C2 and the comparator CP of FIG. 3a. In this case, upon the reference signal ZC being asserted, C3 would be initialized at the offset value VR2, and would count down to 0 at a rate established by the system clock Fsys. Once 0 is reached, the ScanSignal would be produced and the counter C3 initialized at the value Tc that was stored in the register R1. Thereafter, the countdown from Tc to 0 is cyclically resumed, and each time the counter C3 reaches 0, another ScanSignal is generated and the counter C3 reset to Tc.

FIG. 4b shows the output of the circuit 20 shown in FIG. 4a. FIG. 4a differs from the FIG. 3b in that the output from the counter C3 is reset to a high level, and counts down to 0, generating the ScanSignal. In this way, the same ScanSignal can be generated as shown in FIG. 3b, but circuit 20 of FIG. 4a has fewer components than circuit 10 of FIG. 3a.

Figure 5:
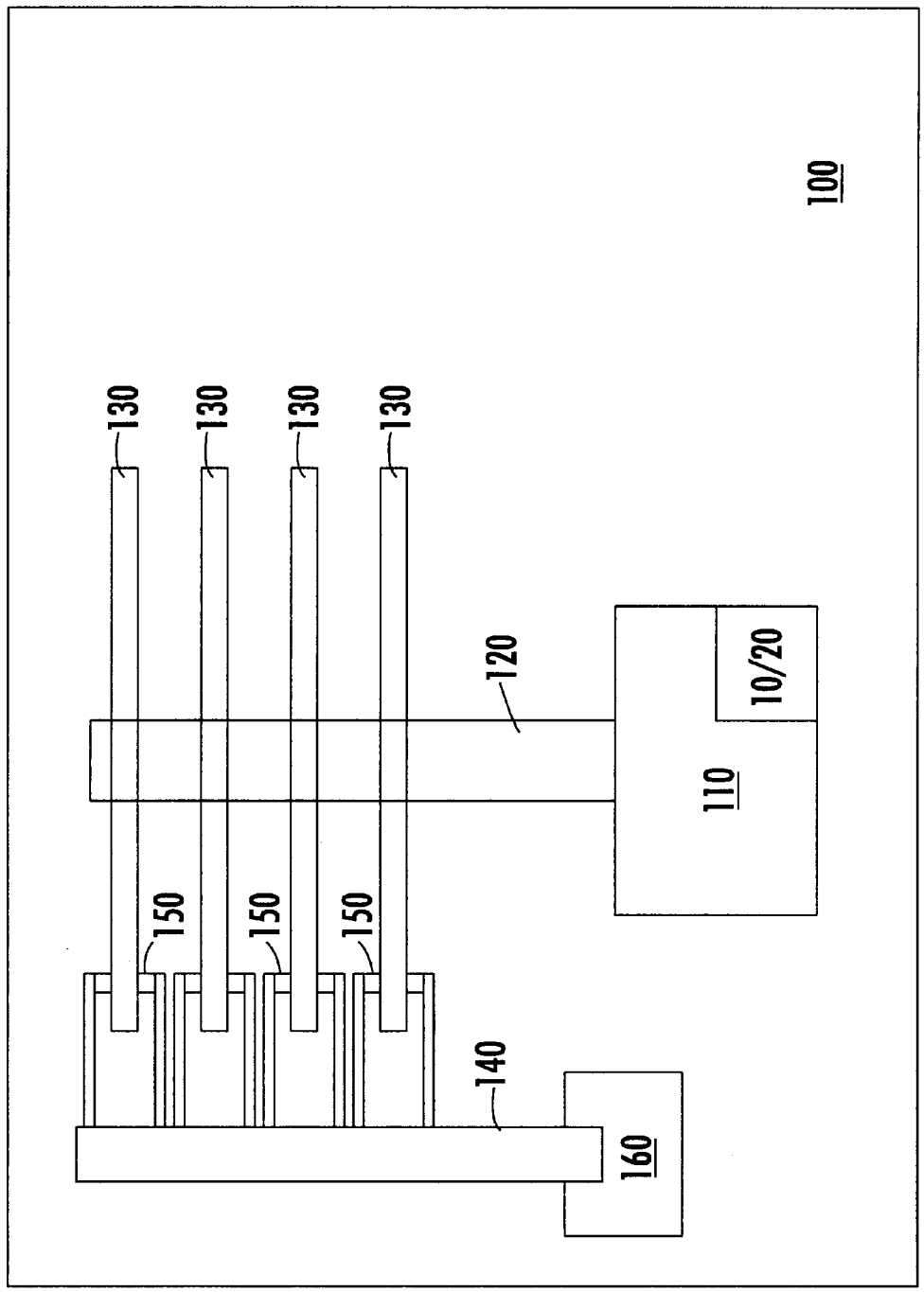
Figure 2:
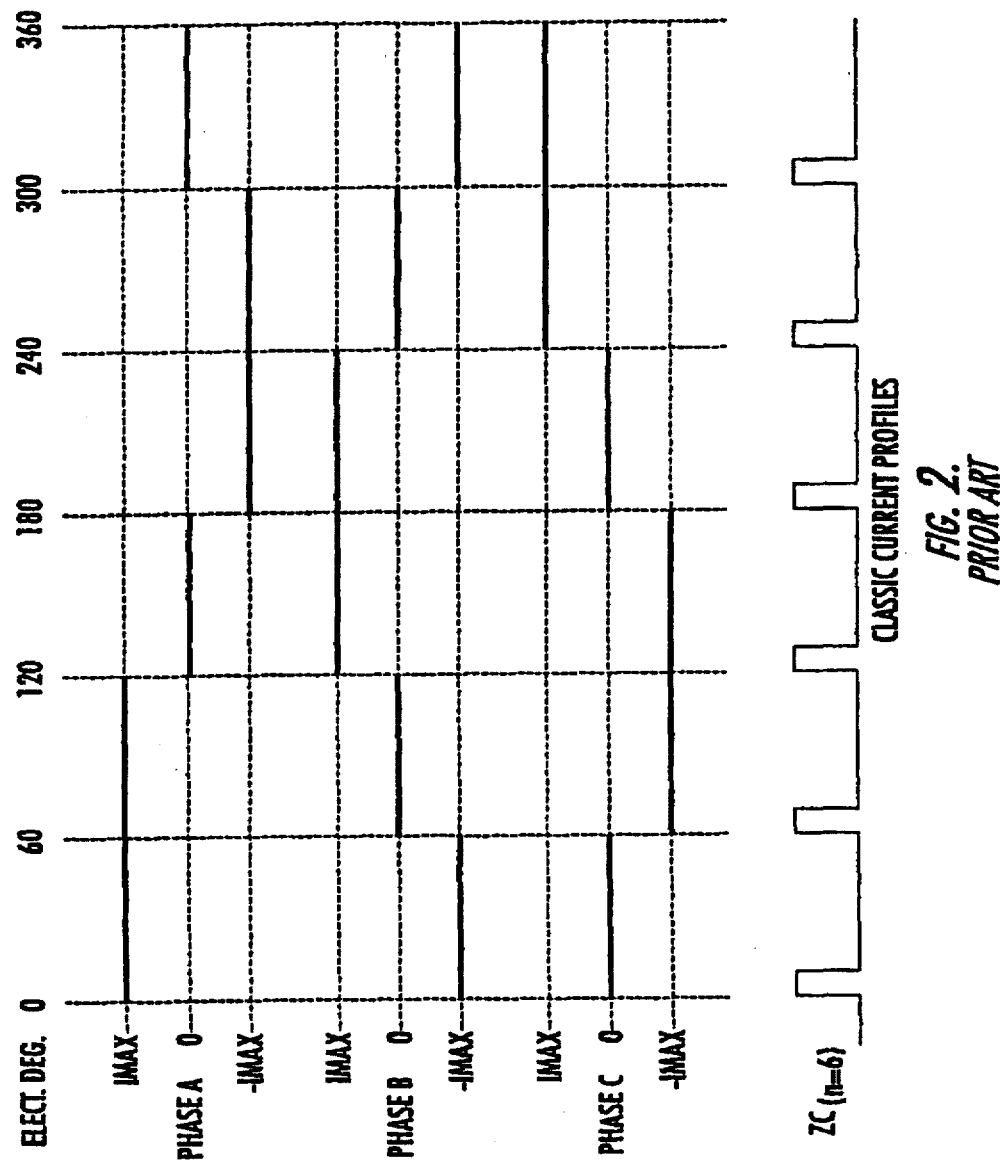

FIG. 5 shows a Hard Disk Drive (HDD) 100 that includes the circuit 10 of FIG. 3a or the circuit 20 of FIG. 4a. Within the HDD 100 is a DC motor 110 coupled to a spindle 120. The spindle is in turn coupled to a number of platters 130. In the HDD 100 shown in FIG. 5, 4 platters 130 are depicted, but more or fewer platters may be present. The platters are made of a magnetic material or a magneto-optical material. A head actuator 140 is coupled to a number of read/write heads 150, which are interleaved within the platters 130. Each platter 130 includes at least one read/write head 150 associated therewith. An actuator motor 160 controls the actuator 140 to position the read/write heads 150 over the desired portion of the platters 130. In operation, the DC motor 110, under control of the circuit 10 or 20, drives the spindle 120, which in turn spins the platters 130. The actuator motor 160 activates to move the actuator 140 in order to position the read/write heads over the portion of the platters 130 necessary to enable reading data from, or writing data to the platters.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

That which is claimed is:

1. In a motor controller, a circuit for generating a fine rotor position signal comprising:
    a circuit input terminal structured to receive a coarse rotor position signal;
    a first counter circuit coupled to the circuit input terminal and having a first counter output, the first counter circuit structured to count at a first rate;
    a second counter circuit having a second counter output and structured to count at a second rate; and
    a comparator structured to receive the outputs of the first and second counter circuits at a first and second input, respectively, the comparator structured to output the fine rotor position signal after comparing signals received at its first and second inputs.

2. The circuit of claim 1 further comprising:
    a system clock terminal structured to accept a system clock signal;
    a clock input terminal for the second counter circuit coupled to the system clock terminal; and
    a clock multiplier having an input coupled to the system clock terminal and having an output coupled to a clock input terminal of the first counter circuit.

3. The circuit of claim 2 wherein a clock signal at the output terminal of the clock multiplier is N times slower than a clock signal at the input terminal of the clock multiplier.

4. The circuit of claim 1 further comprising:
    a multiplexer having a first input coupled to the first counter output, a second input coupled to a storage register, an output coupled to the first input of the comparator, and having a selection input.

5. The circuit of claim 4 wherein the selection input is coupled to a state storage device.

6. The circuit of claim 5 wherein the state storage device is an RS flip-flop, the RS flip-flop structured to receive the coarse rotor position signal at a set input, and structured to receive the fine rotor position signal at a reset input.

7. The circuit of claim 4 wherein the multiplexer is coupled to the first counter output through a second storage register that is structured to contain a numerical representation of a Tc signal that was generated by the first counter circuit.

8. The circuit of claim 4 wherein the storage register contains an offset value indicating how long to delay the output of a first fine rotor position signal after the course rotor position signal is received at the circuit input terminal.

9. In a motor controller, a circuit for generating a fine rotor position signal comprising:
    a circuit input terminal structured to receive a coarse rotor position signal;
    a countdown timer circuit having a load terminal coupled to the circuit input terminal, the countdown timer circuit also having a data value terminal, and an output terminal; and
    a loading circuit coupled to the data value terminal, the loading circuit structured to load a pre-set value into the countdown timer.

10. The circuit of claim 9 wherein the loading circuit is a multiplexer having first and second input terminals, a selection terminal, and having an output terminal coupled to the data value terminal; the circuit further comprising:
    a first register coupled to the first input terminal of the multiplexer; and
    a second register coupled to the second input terminal of the multiplexer.

11. The circuit of claim 10 further comprising a second counter circuit having a reset input coupled to the circuit input terminal, and having an output coupled to the first register.

12. The circuit of claim 10 further comprising:
    a system clock terminal structured to receive a system clock signal;
    an input clock terminal of the countdown timer circuit coupled to the system clock terminal; and
    a clock multiplier circuit having an input terminal coupled to the system clock terminal, and having an output terminal coupled to a clock input terminal of the second counter circuit.

13. The circuit of claim 12 wherein the clock multiplier circuit is structured to generate a signal at its output terminal less frequently than it receives a signal at its input terminal.

14. The circuit of claim 10 wherein the first register is structured to contain a value related to the period between successive fine rotor position signals, and wherein the second register is structured to contain a value related to an offset between the coarse rotor position terminal and a first fine rotor position terminal.

15. A hard disk drive, comprising:
    a plurality of disk platters having a substrate surface capable of storing information;
    a plurality of data heads, at least one data head positioned near the substrate surface of each of the disk platters;
    a spindle coupled to the plurality of disk platters such that when the spindle is rotated, so are the plurality of disk platters;
    a disk drive motor coupled to the spindle and structured to rotate the spindle; and
    a disk drive motor controller circuit coupled to the disk drive motor and including a sub-circuit for generating a fine rotor position signal, the sub-circuit including:
    a circuit input terminal structured to receive a coarse rotor position signal,
    a first counter circuit coupled to the circuit input terminal and having a first counter output, the first counter circuit structured to count at a first rate,
    a second counter circuit having a second counter output and structured to count at a second rate, and
    a comparator structured to receive the outputs of the first and second counter circuits at a first and second input, respectively, the comparator structured to output the fine rotor position signal after comparing signals received at its first and second inputs.

16. The hard disk drive of claim 15 wherein said sub-circuit further comprises:
a system clock terminal structured to accept a system clock signal;
a clock input terminal for the second counter circuit coupled to the system clock terminal; and
a clock multiplier having an input coupled to the system clock terminal and having an output coupled to a clock input terminal of the first counter circuit.

17. The hard disk drive of claim 16 wherein a clock signal at the output terminal of the clock multiplier is N times slower than a clock signal at the input terminal of the clock multiplier.

18. The hard disk drive of claim 15 wherein said sub-circuit further comprises:
a multiplexer having a first input coupled to the first counter output, a second input coupled to a storage register, an output coupled to the first input of the comparator, and having a selection input.

19. The hard disk drive of claim 18 wherein the selection input is coupled to an RS flip-flop structured to receive the coarse rotor position signal at a set input, and structured to receive the fine rotor position signal at a reset input.

20. The hard disk drive of claim 18 wherein the multiplexer is coupled to the first counter output through a second storage register structured to contain a numerical representation of a Tc signal that was generated by the first counter circuit.

21. The hard disk drive of claim 18 wherein the storage register contains an offset value indicating how long to delay a first fine rotor position signal after the coarse rotor position signal is received at the circuit input terminal.

22. A method of generating a fine rotor positional signal in a DC motor comprising:
accepting a first and a second received rotor positional signal from a circuit controlling the DC motor;
counting with a first counter at a first rate to a first data value representing a time period between the first and second received rotor positional signals;
counting with a second counter with a second rate from an original data value toward a second data value; and
generating the fine rotor positional signal when the second counter reaches the second data value.

23. The method of claim 22 wherein both the first and second counters are up-counters, and wherein generating the fine rotor positional signal comprises:
comparing the first data value to a value counted by the second counter; and
outputting the fine rotor positional signal when the first data value and the second data value are equal.

24. The method of claim 22 wherein the first rate is n times slower than the second rate.

25. The method of claim 22 further comprising:
storing the first data value in a first register;
comparing the contents of the first register to a value counted by the second counter; and
outputting the fine rotor positional signal when the value counted by the second counter equals the contents of the first register.

26. The method of claim 25 further comprising:
storing an offset data value in the first register instead of storing the first data value in the first register.

27. The method of claim 22 wherein the first counter is an up-counter and the second counter is a down-counter, and wherein generating the fine rotor positional signal comprises:
initializing the second counter with the first data value; and
outputting the fine rotor positional signal when the second counter equals zero.

28. The method of claim 27 further comprising:
initializing the second counter with an offset data value; and
outputting the fine rotor positional signal when the second counter equals zero.

* * * * *

UNITED STATES PATENT AND TRADEMARK OFFICE
CERTIFICATE OF CORRECTION

PATENT NO. : 6,320,343 B1
DATED : November 20, 2001
INVENTOR(S) : Marco Viti

It is certified that error appears in the above-identified patent and that said Letters Patent is hereby corrected as shown below:

Title page, Item [54], and Column 1, lines 1-3,
Delete "FINE PHASE FREQUENCY MULTIPILER FOR A BRUSHLESS MOTOR AND CORRESPONDING CONTROL METHOD", insert
-- FINE PHASE FREQUENCY MULTIPLIER FOR A BRUSHLESS MOTOR AND CORRESPONDING CONTROL METHOD --

Column 2,
Line 20, delete "diagram a typical" insert -- diagram of a typical --

Figure 1:
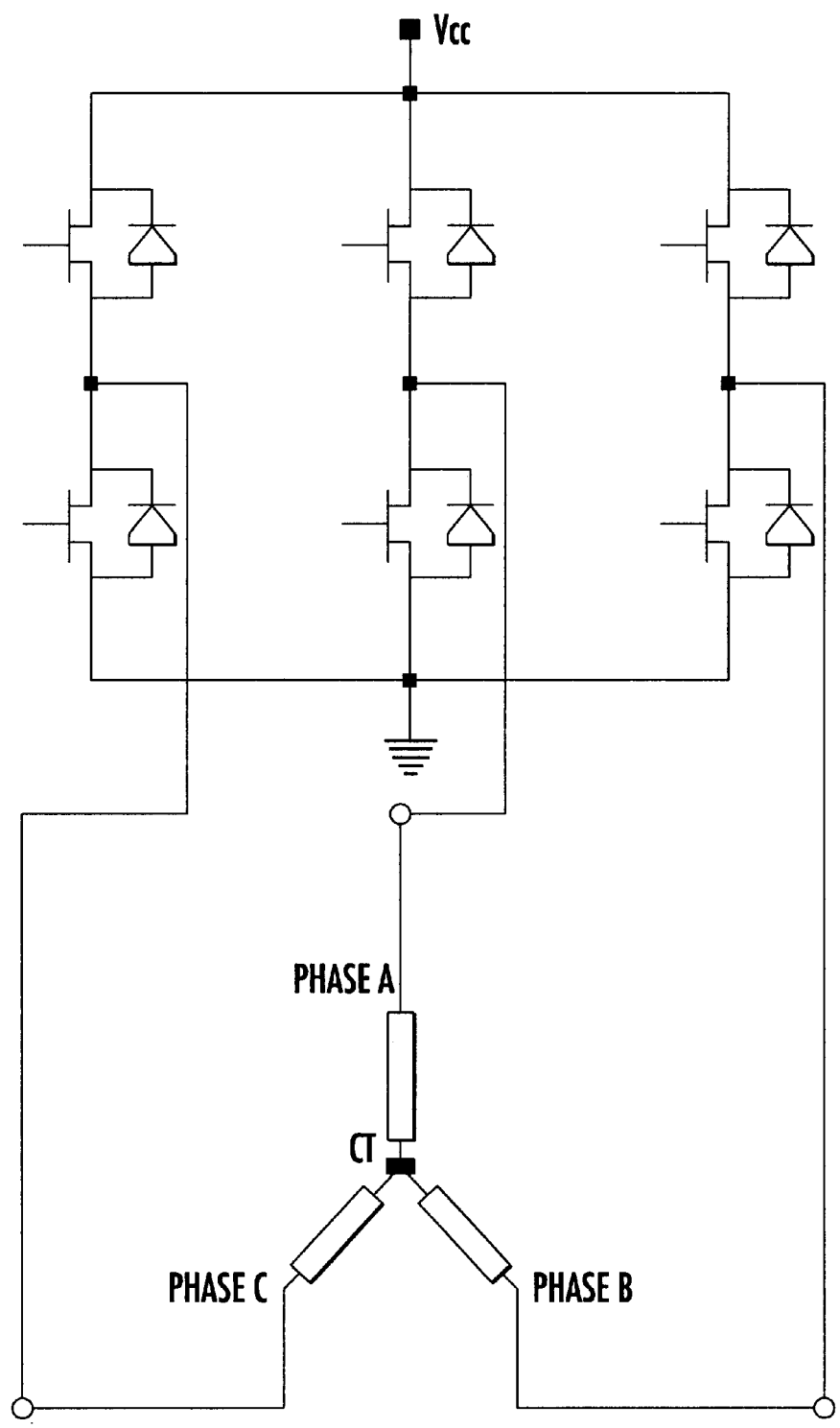
FIG. 1 is a schematic diagram a typical arrangement for driving a brushless motor according to the prior art.
Figure 2:
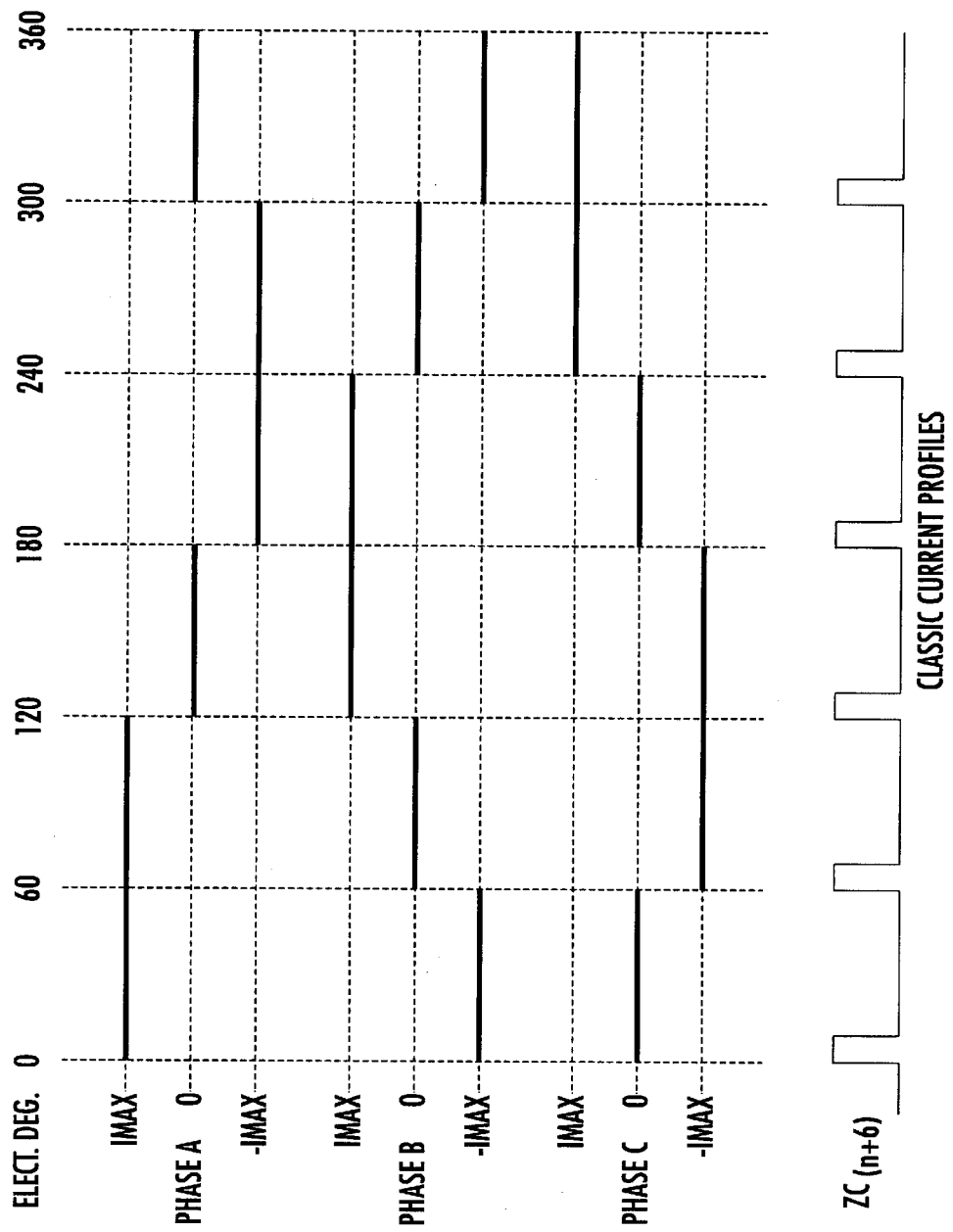
FIG. 2 is a graph of classical waveforms for driving brushless motors, such as the one in FIG. 1.

Drawings,
FIG. 2, delete "FIG. 2" insert -- new FIG. 2 --

Signed and Sealed this

Seventh Day of May, 2002

Attest:

Attesting Officer

JAMES E. ROGAN
Director of the United States Patent and Trademark Office